United States Patent

Weyand

[11] Patent Number: 5,937,692
[45] Date of Patent: Aug. 17, 1999

[54] METHOD FOR MANUFACTURING THE ARMATURE HOUSING OF A SLIDE VALVE

[75] Inventor: Manfred Weyand, Mönchengladbach, Germany

[73] Assignee: Babcock Sempell AG, Germany

[21] Appl. No.: 08/980,333

[22] Filed: Nov. 28, 1997

[30] Foreign Application Priority Data

Nov. 29, 1996 [DE] Germany ............................ 196 49 471

[51] Int. Cl.⁶ ............................................................ B21K 1/24
[52] U.S. Cl. ..................................................... 72/356; 72/377
[58] Field of Search ................................... 72/267, 353.2, 72/354.6, 356, 357, 377; 29/890, 148

[56] References Cited

U.S. PATENT DOCUMENTS 2,298,077 10/1942 Witter ........................................ 72/356
2,663,205 12/1953 Allen .
3,210,984 10/1965 Arbogast .................................. 72/267

FOREIGN PATENT DOCUMENTS 585 460  9/1933  Germany .
1 149 594  5/1963  Germany .......................... 29/890.148

*Primary Examiner*—Lowell A. Larson

[57] ABSTRACT

Using the described method it is possible to manufacture an armature housing of a slide valve integrally including the connection sockets. The method makes use of two forging processes, which are both carried out in the same forging mould (1): The first forging process is designed as a forward flow pressing process, in which the blank (3) is forced into the lower region of the mould cavity (2) with the aid of a first mandrel (4) and thereby also fills the cylindrical recesses (2b) of the mould cavity (2), which correspond to the subsequent connection sockets. The second forging process is designed as a return flow pressing process, in which, by means of a second mandrel (5) having corresponding dimensions, the entire interior (12) of the subsequent armature housing is formed with the exception of the supply and outflow ducts which penetrate the connection sockets. The guide elements, which are used for guiding the sealing member of the slide valve during the movement between the open and closed positions, are preferably simultaneously formed by the second mandrel (5) during the return flow pressing process.

5 Claims, 3 Drawing Sheets

METHOD FOR MANUFACTURING THE ARMATURE HOUSING OF A SLIDE VALVE

The invention relates to a method for manufacturing the armature housing of a slide valve, which comprises a main region and two projecting connection sockets extending perpendicular to the axis of the main region and parallel guide elements for the lateral guidance of the sealing member of the slide valve, with the following steps:

- a) in a first forging process a blank is introduced into a mould, which at least partially corresponds to the outer shape of the desired armature housing;
- b) in a second forging process designed as a return flow pressing process, at least one part of the interior of the armature housing is formed with the aid of a mandrel by extending the blank axially.

A method of this type is known from DE-AS 19 28 585. In this method, the entire armature housing including the connection sockets is not integrally manufactured by forging. Rather, only a central housing section is produced by the two above-mentioned forging processes, into which housing section the separately manufactured connection sockets are then welded on both sides. The forging processes used for manufacturing the central housing section are carried out in two separate tools, the first forging process being carried out as drop forging. Clearly, the known manufacturing process is expensive, since a plurality of method steps, particularly the subsequent welding in place of the connection sockets, and a plurality of forging moulds are required.

It is the object of the invention to provide a method of the initially-stated type which can be carried out in a cost-effective manner.

This object is attained according to the invention in that both method steps are carried out in a single forging mould, whose mould cavity in the lower region corresponds to the outer contour of the desired armature housing including the connection sockets,

- c) the first forging process being a forward flow pressing process carried out using a further mandrel introduced into the mould cavity, in which the blank is pressed fully into the lower region of the mould cavity including the lateral recesses forming the connection sockets;
- d) in the subsequent return flow pressing process, the entire interior of the armature housing is formed with the exception of the supply and outflow ducts penetrating the connection sockets.

According to the invention the entire armature housing including the connection sockets is therefore integrally manufactured, so that there is no longer a need for separate welding processes. The entire manufacturing process only requires a single forging mould and it is merely necessary to use two different mandrels in the successive forging processes. The resulting surfaces on the workpiece which is to be machined exhibit such a degree of quality and precision that secondary machining can be dispensed with. In this manner, considerable costs can be saved as compared with the known method.

Particularly preferred is an embodiment of the method according to the invention in which, during the return flow pressing process, the guide elements for the sealing member are integrally formed onto the curved surface of the interior of the resulting armature housing. A integral moulding of the guide elements does in fact also occur in the manufacture of the central housing section according to the method described in the above-mentioned DE-AS 19 28 585. However, according to the invention the guide elements are forged onto the integrally formed armature housing which includes the connection sockets.

In some cases it may be more expedient, for reasons which are of no further interest here, for the curved surface of the interior of the manufactured armature housing to be smooth and for the guide elements for the sealing member to be constructed on separately manufactured elements, which are subsequently secured in the interior of the armature housing. Two particularly expedient variants of the method according to the invention follow this procedure. In one variant, the guide elements are provided on two guide profiles, which are welded onto diametrally opposed generatrices of the interior of the armature housing. According to the other method variant, all guide elements as well as the valve seats for the sealing member are constructed on an integrally formed insert element, which is introduced into the interior of the armature housing where it is secured in a position in which the valve seats are coaxial to the supply and outflow ducts of the armature housing. In this last-mentioned embodiment of the manufacturing method according to the invention, the wall of the armature housing is in no way weakened by the guide elements for the sealing member of the slide valve, since the separately manufactured elements supporting the guide elements can be attached to a smooth, continuous curved surface, i.e. having a circular cross section, of the interior of the armature housing.

Embodiments of the invention will be explained in further detail with the aid of the drawings, in which:

FIGS. 1a to 1c show the most important stages of a method which can be used to manufacture an integrally formed armature housing of a slide valve comprising the connection sockets.

Figure 1A:
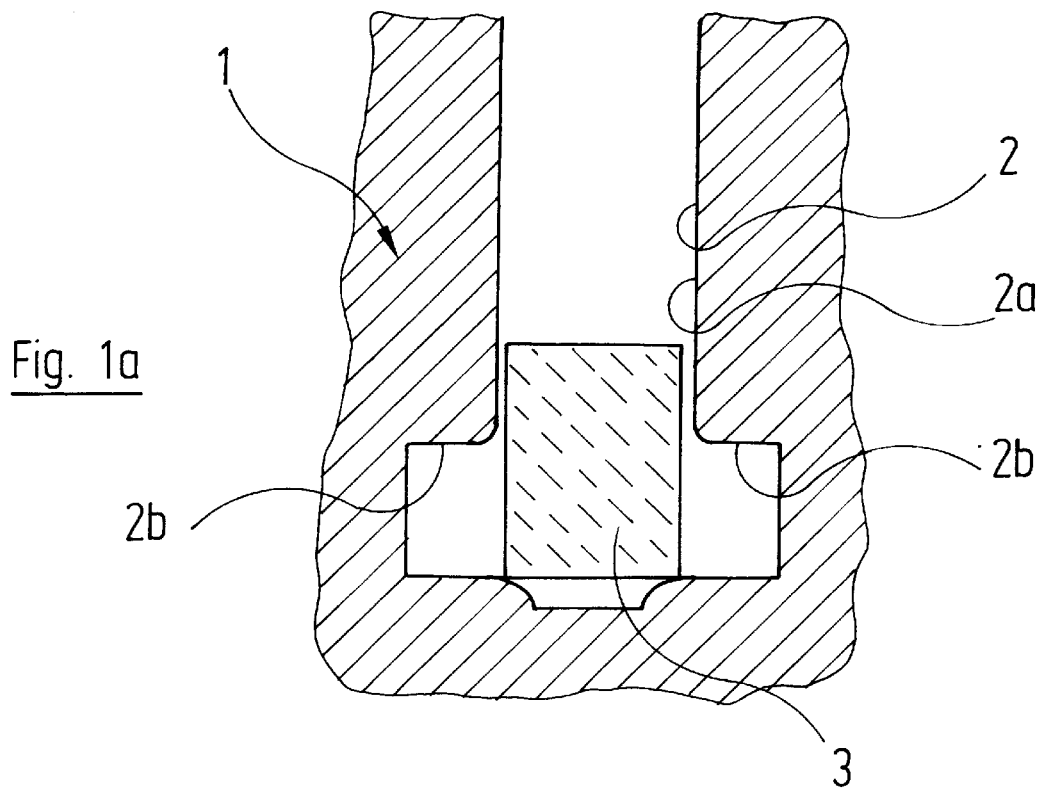
FIGS. 1a to 1c show various stages of the manufacture of an armature housing for a slide valve.
Figure 1B:
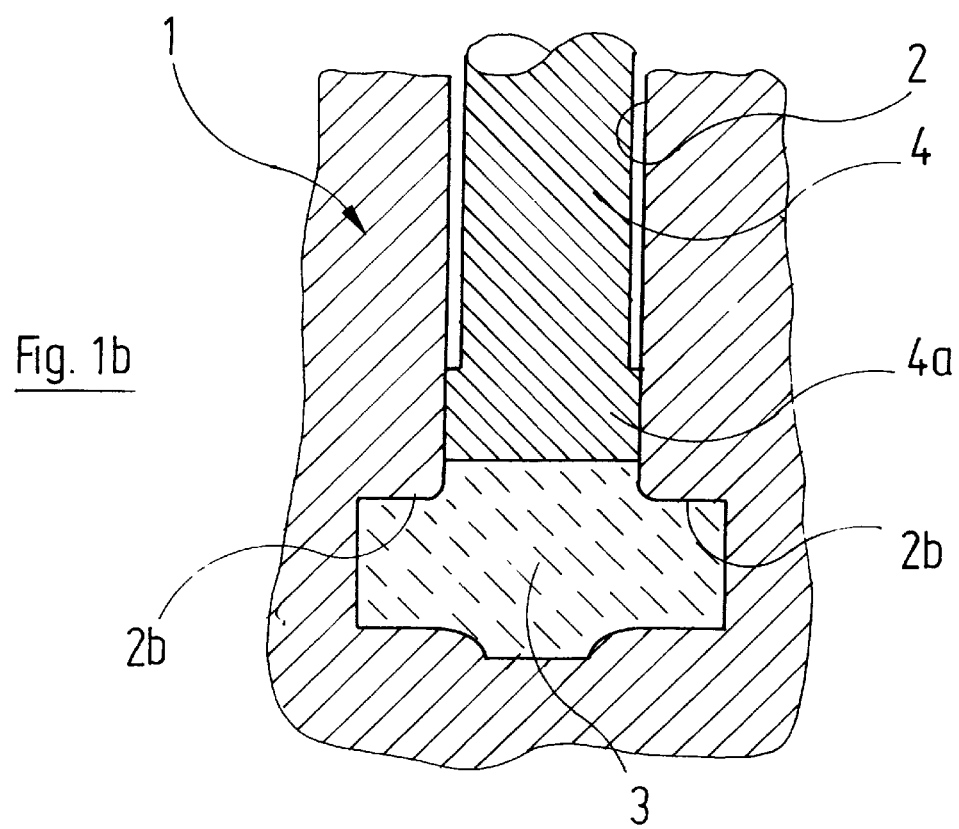
Figure 1C:
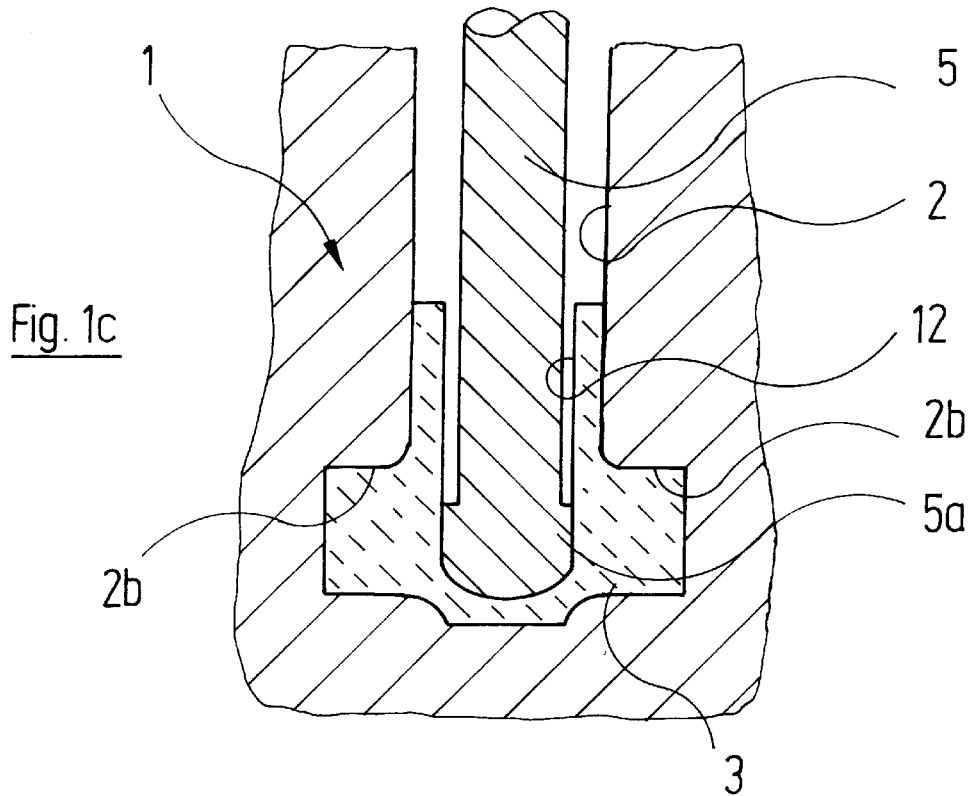

The entire manufacturing method takes place in a single forging mould, which is indicated by the reference numeral 1 in FIGS. 1a to 1c and can be separated in a manner not shown in further detail in order to remove the finished workpiece. The forging mould 1 encloses a mould cavity 2, which in its lower region corresponds to the outer contour of the armature housing which is to be manufactured. This means that a substantially cylindrical, vertically oriented main region 2a is adjoined at the bottom by two diametrally opposed, coaxial cylindrical recesses 2b. The diameter of the cylindrical main region 2a of the mould cavity 2 corresponds to the diameter of the main region of the armature housing which is to be manufactured, whilst the diameter of the cylindrical recesses 2b correspond to the external diameter of the connection sockets which are to be integrally formed onto the armature housing.

The manufacture of the armature housing begins with the introduction of a blank 3 into the mould cavity 2, the blank standing with its lower edge upon a corresponding point in the lower region of the mould cavity 2. The material of the blank 3 is preferably one of the following DIN qualities: C 22.8 1.0406; 15 Mo 3 1.5415, 13 CrMo 44 1.7335; 10 CrMo 910 1.7380. The blank 3 has a maximum temperature of 1250° C.

The blank 3 inserted in this manner into the mould cavity 2 is then subjected to a first method step, a forward flow pressing process, the result of which is shown in FIG. 1b. During this process, a first mandrel 4 is inserted, whose enlarged head 4a has an external diameter corresponding to the internal diameter of the main region 2a of the mould cavity 2. By way of this first mandrel 4a, the blank 3 is deformed in such a manner that it fills the entire lower region of the mould cavity 2, including the cylindrical recesses 2b. During this method step, the blank 3 already receives the outer contour of the lower region of the armature which is to be manufactured, but is still solid (without a formed interior) and does not yet comprise the final height in the vertical direction.

The desired form of the armature housing is obtained in a third method step, whose result is illustrated in FIG. 1c. To this end, the first mandrel 4 is withdrawn from the mould cavity 2 of the forging mould 1. In its place, a second mandrel 5 is introduced into the mould cavity 2, coaxial to the main region 2a of said mould cavity 2. Perpendicular to the axis of the second mandrel 5, the head 5a of the second mandrel 5 comprises a cross section corresponding to the cross section of the interior of the armature housing which is to be manufactured. In the simplest case, the head 5a of the second mandrel 5 has a circular cross section; in cases where this type of mandrel is used an armature housing interior is obtained which is also circular in cross section with smooth curved surfaces.

With the introduction of the second mandrel 5a into the blank 3 illustrated in FIG. 1b, a return flow pressing process takes place. In other words: since the material of which the blank 3 consists can no longer be displaced further in the forward direction, part of the material flows upwards along the outer surface of the head 5a and along the curved surface of the main region 2a of the mould cavity 2 and thus forms the upper, substantially cylindrical main region of the armature housing. Of course, the wall thickness of this main region of the armature housing corresponds to the difference of the radii of the main region 2a of the mould cavity 2 and the head 5a of the second mandrel 5.

Following cooling of the workpiece produced in this manner, the forging mould 1 can be opened and the workpiece removed. There is no need for any further secondary machining of the surfaces which are produced by the two-stage forging process. It is merely necessary to form the supply and outflow ducts in the connection sockets.

The forging mould 1 is preferably made of steel; the mandrels 4 and 5 comprise a particularly hard surface and are occasionally tested for accuracy to size.

Figure 2:
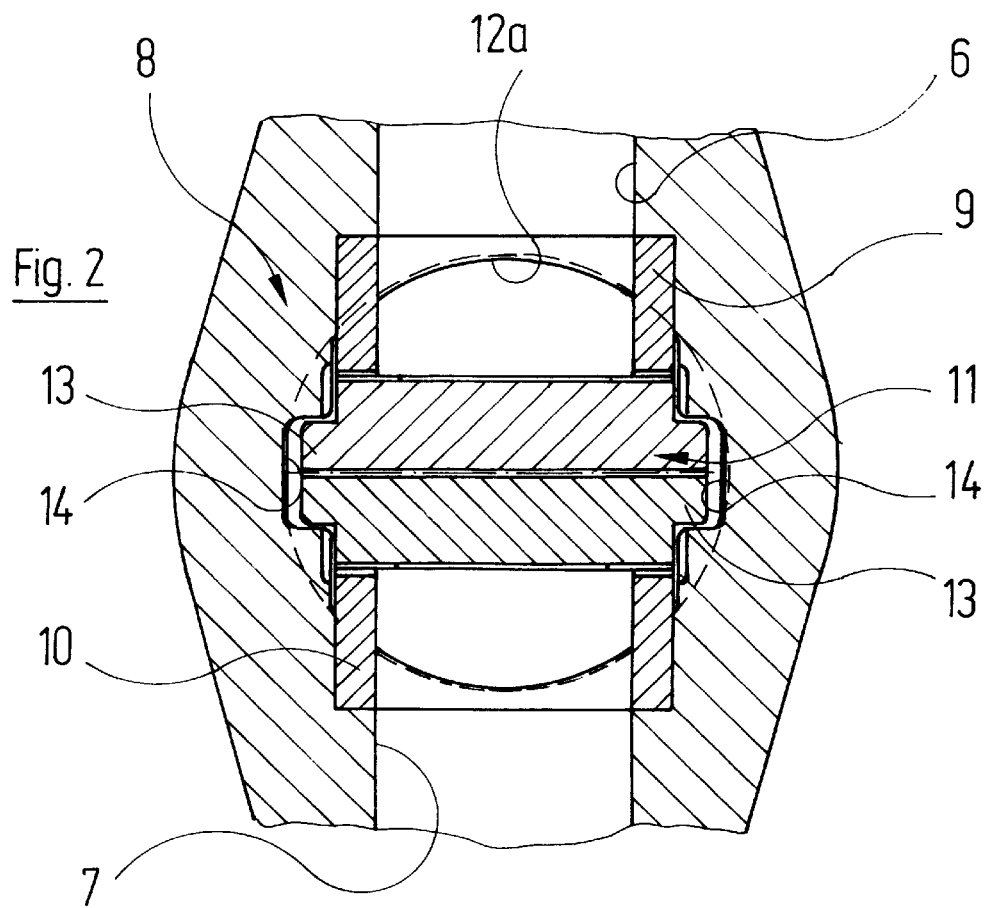
FIG. 2 is a horizontal section through part of a slide valve with an armature housing manufactured using the method according to the invention, the plane of section lying in the central plane of the supply and outflow ducts.

FIG. 2 is a partial section through a slide valve comprising a particularly preferred embodiment of an armature housing 8. The section is horizontal, lying in the centre plane of the supply and outflow ducts 6, 7, which pass through the connection sockets of the armature housing 8. The connection sockets per se are broken off in FIG. 2, i.e. not shown for the sake of clarity; they are to be imagined attached at the top and bottom of the drawing.

In addition to the armature housing 8, which will be explained in further detail below, the slide valve also comprises, in a manner known per se, valve seat rings 9, 10, which are secured to the inner ends of the supply and outflow ducts 6, 7 respectively. These valve seat rings 9, 10 cooperate with a two-part sealing member 11 of the slide valve, which can be driven as a whole by means of a spindle, not shown in the drawing, from the closed position shown in FIG. 4 backwards, perpendicular to the plane of the drawing, into an open position. The sealing member 11 is thereby moved from the position between the valve seat rings 9, 10 into the cylindrical main region 12a of the interior 12 of the armature housing 8, which in the method step illustrated in FIG. 1c was produced by the head 5a of the second mandrel 5. During this movement, the sealing member 11 is guided by laterally projecting, rib-like guide profiles 13, which engage in correspondingly profiled guide grooves 14 in the interior 12 of the armature housing 8. These guide grooves 14 have already been integrally formed during the execution of the method step illustrated in FIG. 1c. To this end, the head 5a of the second mandrel is simply provided with a corresponding cross section profiling. As shown in FIG. 2, the base of the guide grooves 14, viewed in cross section, lies on the circle which corresponds to the general shape of the main region 12a of the interior 12. The armature housing 8 is therefore not weakened by these guide grooves 14.

The armature housing 8 shown in FIG. 2 with the integrally forged-on guide grooves 14 is, of course, particularly cost-effective, since there is no need for any special manufacturing processes in order to produce the guide grooves 14. The precision and surface quality of the reverse flow pressing process, in which the guide grooves 14 are produced in the method step shown in FIG. 1c, is entirely adequate, so that it is possible to dispense with a secondary machining of the surfaces in question.

However, the method illustrated by way of FIGS. 1a to 1c can also be used in armature housings in which, for reasons which are of no further interest here, the guide elements of the armature housing, which undertake the function of lateral guidance of the sealing member of the slide valve, are only fitted at a later stage. Two embodiments of this type are shown in FIGS. 3 and 4.

Figure 3:
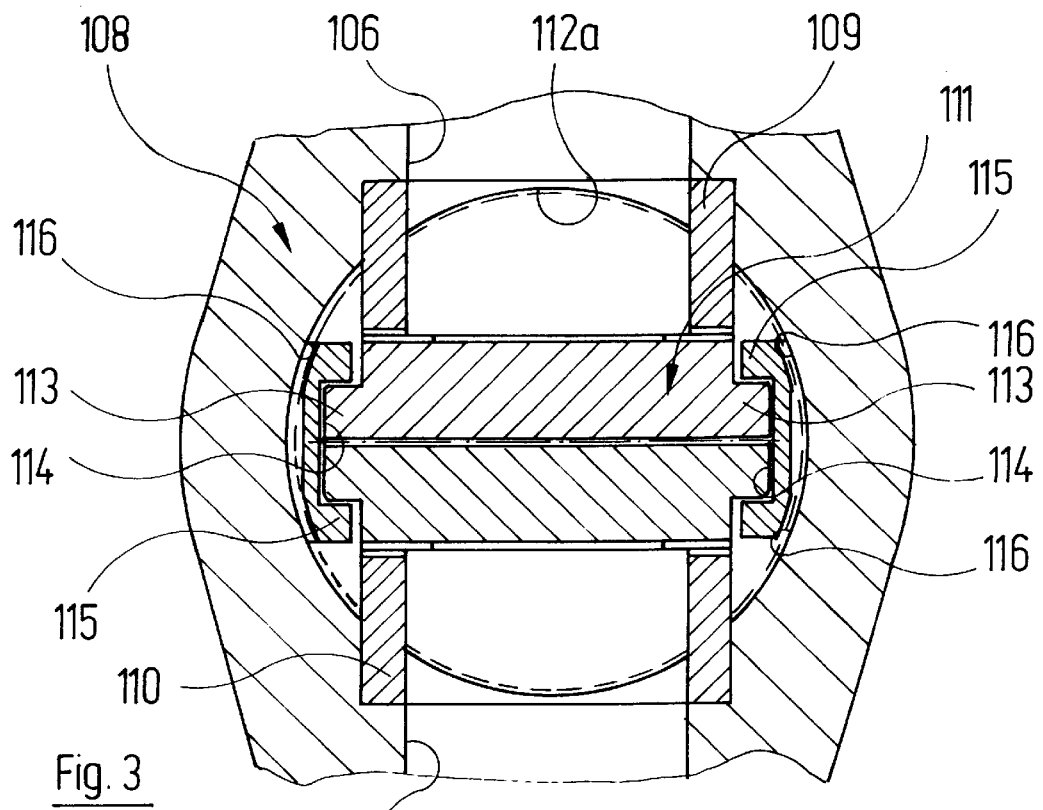
FIG. 3 is a section, similar to FIG. 2, through a second embodiment of a slide valve with an armature housing manufactured according to the invention.

The embodiment of FIG. 3 is very similar to that of FIG. 2, so that corresponding parts are provided with corresponding reference numerals, increased by 100. Thus, the embodiment of FIG. 3 also comprises an armature housing 108, whose connection sockets, no longer recognisable in the drawing, are penetrated by supply and outflow ducts 106 and 107. Fitted to the inner ends of the supply and outflow ducts 106, 107 are valve seat rings 109, 110, which cooperate with the sealing member 111 of a slide valve. The sealing member 111 is also provided with lateral, rib-like guide profiles 113, which engage in guide grooves 114. However, in contrast to the embodiment in FIG. 2, these guide grooves 114 are not directly forged into the armature housing 108. Rather, they are provided on separate guide profile elements 115, which are secured to the inner curved surface of the interior 112 of the armature housing 108 at a suitable location by means of welding points 116.

In the manufacture of the armature housing 108 illustrated in FIG. 3, it is possible to use the same forging mould 1 and the same first mandrel 4 (cf. FIGS. 1a and 1b) as are used in the manufacture of the armature housing 8 of FIG. 2. However, in place of a second mandrel 5 with a head 5a producing a guide groove, a second mandrel 105 is used for manufacturing the armature housing 108 of FIG. 3, whose enlarged head 105a is completely circular in cross section, and therefore produces an interior 112 of the armature housing 108 which is also completely circular in cross section. The guide profile elements 115 can then be welded, lying opposite one another, onto the curved surface of the interior 112 formed in this manner.

Figure 4:
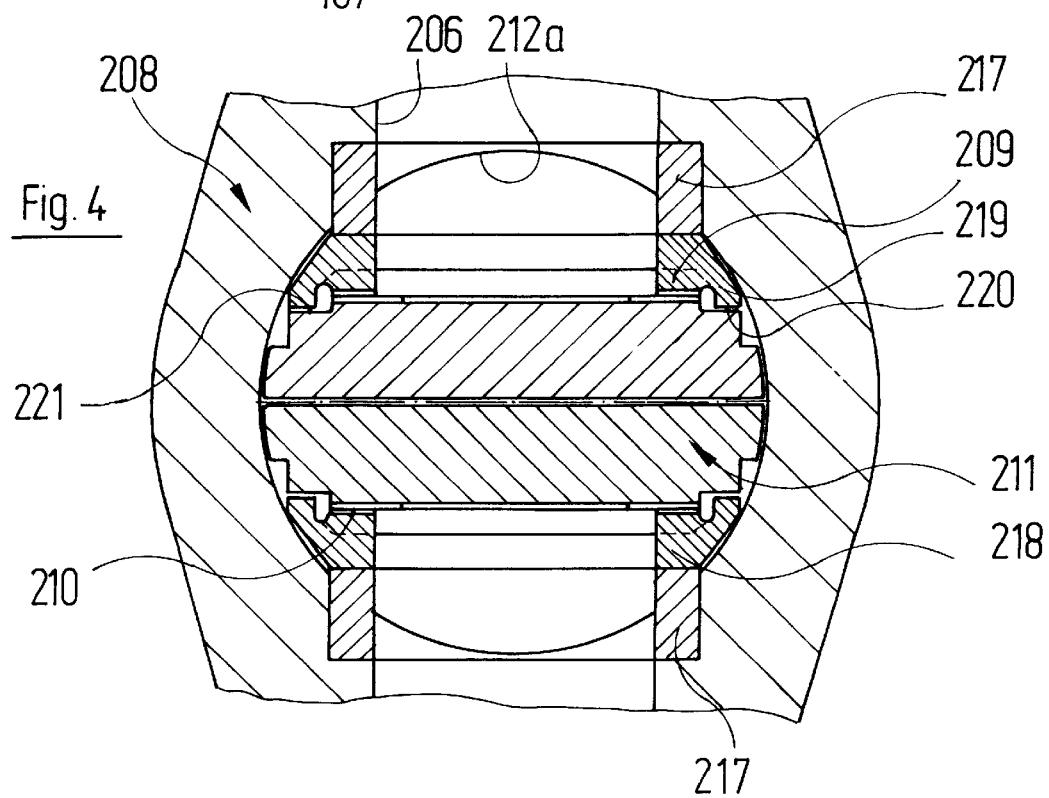
FIG. 4 is a section, similar to FIGS. 2 and 3, through a third embodiment of a slide valve with an armature housing manufactured according to the invention.

The embodiment according to FIG. 4 is also very similar to the embodiment of FIG. 2; corresponding parts are therefore provided with the same reference numerals, increased by 200. FIG. 4 shows the armature housing 208, the supply and outflow ducts 206, 207 and the sealing member 211 of the slide valve. Annular inserts 217 are provided at the inner ends of the supply and outflow ducts 206, 207 in a similar manner to the valve seat rings 9, 10 in the embodiment of FIG. 2. In FIG. 4, the valve seats 209 and 210 are constructed on an integral insert element 218, which is lowered "in the manner of a shirt" into the lower region of the interior 212 of the armature housing 208 where it is secured in such a manner that the valve seats 209, 210 are coaxial to the supply and outflow ducts 206, 207 respectively.

Guide ribs 219 are integrally formed onto the insert element 218 in pairs on opposite sides of the central plane of the armature housing 208 extending perpendicular to the plane of the drawing, the guide ribs 219 being provided with guide surfaces 220 oriented towards one another, i.e. in the direction of the opposite sides of the sealing member 211. These guide surfaces 220 cooperate with parallel guide surfaces 221 on the opposite sides of the sealing member 211, so that as a result of the abutting guide surfaces 220, 221 a precise guidance of the sealing member 211 on the path between the open position and the closed position illustrated in the drawings is possible.

In the manufacture of the armature housing 208 illustrated in FIG. 4, the same tools can be used as in the manufacture of the armature housing 108 of FIG. 3.

I claim:

1. A method for manufacturing the armature housing of a slide valve, which comprises a main region and two projecting connection sockets extending perpendicular to the axis of the main region and parallel guide elements for the lateral guidance of the sealing member of the slide valve, with the following steps:

a) in a first forging process a blank is introduced into a mould, which at least partially corresponds to the outer shape of the desired armature housing of a slide valve;

b) in a second forging process designed as a return flow pressing process, at least one part of the interior of the armature housing is formed with the aid of a mandrel by extending the blank axially, wherein both method steps are carried out in a single forging mould (1), whose mould cavity (2) in the lower region corresponds to the outer contour of the desired armature housing (8; 108; 208) including the connection sockets, c) the first forging process being a forward flow pressing process carried out using a further mandrel (4) introduced into the mould cavity (2), in which the blank (3) is pressed fully into the lower region of the mould cavity (2) including the lateral recesses (2b) forming the connection sockets of a slide valve;

d) in the subsequent return flow pressing process, the entire interior (12; 112; 212) of the armature housing (8; 108; 208) is formed with the exception of the supply and outflow ducts (6, 7; 106, 107; 206, 207) penetrating the connection sockets.

2. A method as claimed in claim 1, wherein, during the return flow pressing process, the guide elements (14) for the sealing member (11) of the slide valve are integrally formed onto the curved surface of the interior (12) of the resulting armature housing (8).

3. A method as claimed in claim 1, wherein the guide elements (114; 214) for the sealing member (111; 211) are constructed on separately manufactured elements (115; 218), which are subsequently secured in the interior (112; 212) of the armature housing (108; 208).

4. A method as claimed in claim 3, wherein the guide elements (114) are provided on two guide profile elements (115), which are welded onto diametrally opposed generatrices of the interior (112) of the armature housing (108).

5. A method as claimed in claim 3, wherein all guide elements (219, 220) as well as the valve seats (209, 210) for the sealing member (211) are constructed on an integrally formed insert element (218), which is introduced into the interior (212) of the armature housing (208) where it is secured in a position in which the valve seats (209, 210) are coaxial to the supply and outflow ducts (206, 207) of the armature housing (208).

* * * * *